United States Patent [19]
Rao et al.

[11] Patent Number: 5,719,774
[45] Date of Patent: Feb. 17, 1998

[54] SYSTEM AND METHOD FOR RELATING DISPARATE DATA MODELS OF PHYSICAL OBJECTS

[75] Inventors: Kashipati G. Rao; Bruce E. Flinchbaugh, both of Dallas, Tex.

[73] Assignee: Texas Instruments Incorporated, Dallas, Tex.

[21] Appl. No.: 99,303

[22] Filed: Jul. 29, 1993

Related U.S. Application Data

[63] Continuation of Ser. No. 510,761, Apr. 18, 1990, abandoned.

[51] Int. Cl.$^6$ ............................................. G06F 19/00
[52] U.S. Cl. ............................................. 364/458; 364/578
[58] Field of Search ............................ 364/458, 516, 364/514 R, 578; 382/103, 106, 312

[56] References Cited

U.S. PATENT DOCUMENTS

| | | | |
|---|---|---|---|
| 4,244,029 | 1/1981 | Hogan et al. | 364/728 |
| 4,396,903 | 8/1983 | Habicht et al. | 382/9 |
| 4,470,048 | 9/1984 | Short, III | 343/5 SA |
| 4,845,610 | 7/1989 | Parvin | 364/200 |
| 4,887,304 | 12/1989 | Terzian | 382/30 |
| 4,901,362 | 2/1990 | Terzian | 382/22 |
| 4,959,800 | 9/1990 | Woolley | 364/516 |

OTHER PUBLICATIONS

"Space–Scale Filtering", A.P. Witkin, Proceedings of the Eighth International Joint Conference on Artificial Intelligence, Aug., 1983, pp. 1019–1022.

*Primary Examiner*—Vincent N. Trans
*Attorney, Agent, or Firm*—W. Daniel Swayze, Jr.; W. James Brady, III; Richard L. Donaldson

[57] ABSTRACT

A method for deriving a two-dimensional first-range data model at a distance, d, from a two-dimensional second-range data model at a distance, $d_0$. The method (10) comprises the steps of first smoothing the second-range data model, I, by masking the second-range data model by a masking matrix (step 24) and next undersampling the smoothed second-range data model (step 26) to yield a first-range data model. Both steps for smoothing (step 24) and undersampling (step 26) use operators depending on the ratio of the first-range distance, d, to the second-range distance, $d_0$. One aspect of the invention includes a distance relating system (80) that performs the smoothing step (step 24) and undersampling step (step 26) to generate first-range data models from second-range data models in an intelligent sensor system.

21 Claims, 6 Drawing Sheets

256 x 256 ABSORPTIVITY
DATA MODEL

| $I_{1,1}$ | $I_{1,2}$ | $I_{1,3}$ | $I_{1,4}$ | $I_{1,5}$ | . . . | $I_{1,255}$ | $I_{1,256}$ |
|---|---|---|---|---|---|---|---|
| $I_{2,1}$ | $I_{2,2}$ | $I_{2,3}$ | $I_{2,4}$ | $I_{2,5}$ | . . . | $I_{2,255}$ | $I_{2,256}$ |
| $I_{3,1}$ | $I_{3,2}$ | $I_{3,3}$ | $I_{3,4}$ | $I_{3,5}$ | . . . | $I_{3,255}$ | $I_{3,256}$ |
| $I_{4,1}$ | $I_{4,2}$ | $I_{4,3}$ | $I_{4,4}$ | $I_{4,5}$ | . . . | $I_{4,255}$ | $I_{4,256}$ |
| $I_{5,1}$ | $I_{5,2}$ | $I_{5,3}$ | $I_{5,4}$ | $I_{5,5}$ | . . . | $I_{5,255}$ | $I_{5,256}$ |
| . | . | . | . | . | | . | . |
| . | . | . | . | . | | . | . |
| . | . | . | . | . | | . | . |
| $I_{255,1}$ | $I_{255,2}$ | $I_{255,3}$ | $I_{255,4}$ | $I_{255,5}$ | . . . | $I_{255,255}$ | $I_{255,256}$ |
| $I_{256,1}$ | $I_{256,2}$ | $I_{256,3}$ | $I_{256,4}$ | $I_{256,5}$ | . . . | $I_{256,255}$ | $I_{256,256}$ |

$= I_{w,z}$

ABSORPTIVITY DATA MODEL MATRIX

*FIG. 2*

| | | | | ⌐44 |
|---|---|---|---|---|
| 7.3850EE−5 | 2.1582EE−3 | 6.6478EE−3 | 2.1582EE−3 | 7.3850EE−5 |
| 2.1582EE−3 | 6.0372EE−2 | 1.9427EE−1 | 6.0372EE−2 | 2.1582EE−3 |
| 6.6478EE−3 | 1.9427EE−1 | 5.9841EE−1 | 1.9427EE−1 | 6.6478EE−3 |
| 2.1582EE−3 | 6.0372EE−2 | 1.9427EE−1 | 6.0372EE−2 | 2.1582EE−3 |
| 7.3850EE−5 | 2.1582EE−3 | 6.6478EE−3 | 2.1582EE−3 | 7.3850EE−5 |

=

5 x 5 MASKING MATRIX

| $M_{1,1}$ | $M_{1,2}$ | $M_{1,3}$ | $M_{1,4}$ | $M_{1,5}$ |
|---|---|---|---|---|
| $M_{2,1}$ | $M_{2,2}$ | $M_{2,3}$ | $M_{2,4}$ | $M_{2,5}$ |
| $M_{3,1}$ | $M_{3,2}$ | $M_{3,3}$ | $M_{3,4}$ | $M_{3,5}$ |
| $M_{4,1}$ | $M_{4,2}$ | $M_{4,3}$ | $M_{4,4}$ | $M_{4,5}$ |
| $M_{5,1}$ | $M_{5,2}$ | $M_{5,3}$ | $M_{5,4}$ | $M_{5,5}$ |

FIG. 4 GENERATION OF SMOOTHED TWO-DIMENSIONAL MODEL WITH M=5

FIG. 5  GENERATION OF UNDERSAMPLED TWO-DIMENSIONAL MODEL WITH M=5

SHORT-RANGE DATA MODEL

FIG. 6a

LONG-RANGE DATA MODEL

FIG. 6b

SHORT-RANGE DATA MODEL

FIG. 7a

LONG-RANGE DATA MODEL

FIG. 7b

SYSTEM AND METHOD FOR RELATING DISPARATE DATA MODELS OF PHYSICAL OBJECTS

This application is a Continuation of application Ser. No. 07/510,761, filed Apr. 18, 1990, now abandoned.

TECHNICAL FIELD OF THE INVENTION

The present invention generally concerns relating disparate data models of physical objects, and more particularly pertains to a method and system for predictably generating long-range data models from short-range data models.

BACKGROUND OF THE INVENTION

For many military and industrial applications, intelligent sensor systems exist and are in development that recognize sensed signals and assist the user to interpret the signals. A wide variety of intelligent sensor systems compare data that the systems store in a memory to the signals that the sensor system detects. Uses for these types of systems may include, for example, automatic target recognition systems, environmental research and military satellites, industrial quality control devices, and medical laboratory research microscopes. These intelligent systems use a variety of sensing media including infrared radiation, visible light, ultraviolet radiation, radio frequency waves, x-rays and gamma radiation.

Common to all these intelligent sensor systems is the problem of relating the signals that the sensor detects to the data models in the system's computer memory. This problem becomes particularly difficult when the data model in memory is in high resolution and the sensor detects signals in low resolution. To date, no known method simply and reliably relates low resolution data models to high resolution data models that an intelligent sensor system may hold in a computer memory. Thus, there is a need for a method and system to assist intelligent sensor systems to simply and reliably relate high resolution data models in a system memory to low resolution signals that the system detects.

Some research in the field of artificial intelligence offers insight to the problem of relating high resolution signals to low resolution signals. A. P. Witkin, *Space-Scale Filtering*, PROCEEDINGS OF THE EIGHTH INTERNATIONAL JOINT CONFERENCE ON ARTIFICIAL INTELLIGENCE, August, 1983, pp. 1019-1022, indicates that it is possible to uniformly describe the maximum and minimum values, or extrema, of physical signals over a wide range of resolutions and to describe the extrema in a way that constrains and guides methods of characterizing the physical signals. In other words, Witkin shows that it is possible to create a uniform relationship between a physical signal and various resolutions at which the signal may be characterized. In particular, this work shows that as the resolution of a one-dimensional physical signal changes, the points at which the signal intersects a fixed zero crossing line through which the signal passes also changes in a regular way.

By applying these concepts, it is possible to understand that a difference in sensor-to-object distances between short-range signals and long-range signals changes the resolution in a regular way. If a method existed to simulate the way in which changes in sensor-to-object distances change short-range data models to produce long-range data models, then an intelligent sensor system incorporating this method could generate long-range data models from short-range data models. A sensor system capable of generating long-range data models to compare with long-range detected signals could more easily interpret detected signals than a system without such capability. There is, therefore, a need for a method that simulates the way in which changes in distance produce changes in resolution from short-range models to long-range models.

Often a sensor system detects multi-dimensional objects to produce multi-dimensional signals. For example, an infrared sensor system often senses three dimensional objects and produces a two-dimensional signal. The infrared sensor system describes the two-dimensional signal by horizontal and vertical point coordinates. The research of Witkin and others indicates that it is possible to work with one-dimensional physical signals to relate high resolution signals to low resolution signals. No one, however, has come forward with a method for relating multi-dimensional short-range data models to multi-dimensional long-range data models. There is a need for a method and system to relate multi-dimensional short-range models to multi-dimensional long-range models.

Consequently, a need exists for a method and system to relate disparate data models that have applications in a wide variety of intelligent sensor systems, including automatic target recognition systems, environmental research and military satellites, industrial quality control devices, and medical laboratory research microscopic sensors. There is also a need for a method and system that have applications in a variety of sensing media, including infrared radiation, visible light, ultraviolet waves, radio frequency waves, and x-rays and gamma rays.

SUMMARY OF THE INVENTION

In view of the foregoing disadvantages inherent in known methods and systems in the prior art, the present invention provides a method and system for relating disparate data models. Moreover, with a short-range data model in sensor system memory, the method of the present invention provides a system for generating a long-range data model for the intelligent sensor system to compare with signals that it detects.

One aspect of the present invention is a method which allows the user to transform a short-range model of high resolution data to a plurality of long-range models having low resolution and longer sensor-to-object ranges. This method permits an intelligent sensor system to match a long-range data model it generates to long-range signals it detects. The method of relating short-range models to long-range models facilitates intelligent sensor system recognition processes.

According to one aspect of the invention, the method includes smoothing the surfaces of the short-range data model by a multi-dimensional statistical distribution having a zero mean and standard deviation that increases with increases in sensor-to-object distance. The statistical distribution standard deviation determines a multi-dimensional masking operator for convolution of the short-range model. Convolution by the multi-dimensional masking operator smoothes the short-range data model. Following smoothing, the method entails undersampling the short-range data model to produce a long-range data model as a function of the sensor-to-object distance.

Another aspect of the present invention includes a method for relating short-range data models to long-range data models that includes the steps of smoothing the surfaces of the short-range data model by a multi-dimensional Gaussian statistical distribution with zero mean and a standard deviation, σ. The standard deviation, σ, is a function of the ratio of the long-range sensor-to-object distance to the short-range sensor-to-object distance. Using the standard deviation of the Gaussian distribution, the method generates a multi-dimensional masking matrix whose elements correspond to values of the multi-dimensional Gaussian statistical distribution. The method uses the masking matrix to smooth the short-range data model. The size of the multi-dimensional masking matrix is a function of σ. The value of each element of the masking matrix equals the value of the Gaussian distribution where the independent variables of the Gaussian distribution equal the row and column number distances of the masking matrix element from the center element in the masking matrix. After smoothing the short-range data model, undersampling the result produces the desired low resolution data model. An undersampling factor depends on the ratio of the long-range sensor-to-object distance to the short-range sensor-to-object distance. The undersampling factor determines the size of the long-range model.

According to another aspect of the invention, the present invention provides a distance relating system for relating short-range models to long-range models. The system comprises a memory for containing short-range high resolution data models. The system also receives a long-range distance input from the intelligent sensor system. A smoothing circuit extracts and receives high resolution data models from the memory and smoothes the high resolution data models as a function of the ratio of the long-range sensor-to-object distance to a short-range sensor-to-object distance. An undersampling circuit receives the smoothed data models and undersamples the data model to generate a long-range low resolution model from the high resolution model. The undersampling circuit undersamples as a function of the ratio of the long-range sensor-to-object distance to the short-range sensor-to-object distance. Output circuitry sends the long-range data model to the remainder of the intelligent sensor system for recognition purposes.

A technical advantage of the present invention is that it provides a method for relating short-range models to long-range models.

Another technical advantage of the present invention is that it provides a method for generating multi-dimensional long-range models from multi-dimensional short-range models.

Yet another technical advantage of the present invention is that it provides a system for generating many long-range data models from a small number of short-range models. An intelligent sensor system can more easily use the generated long-range model for comparison with long-range sensor information that it detects.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention is best understood by referring to FIGS. 1–8 of the drawings, like numerals being used for like and corresponding parts of the various drawings.

Figure 1:
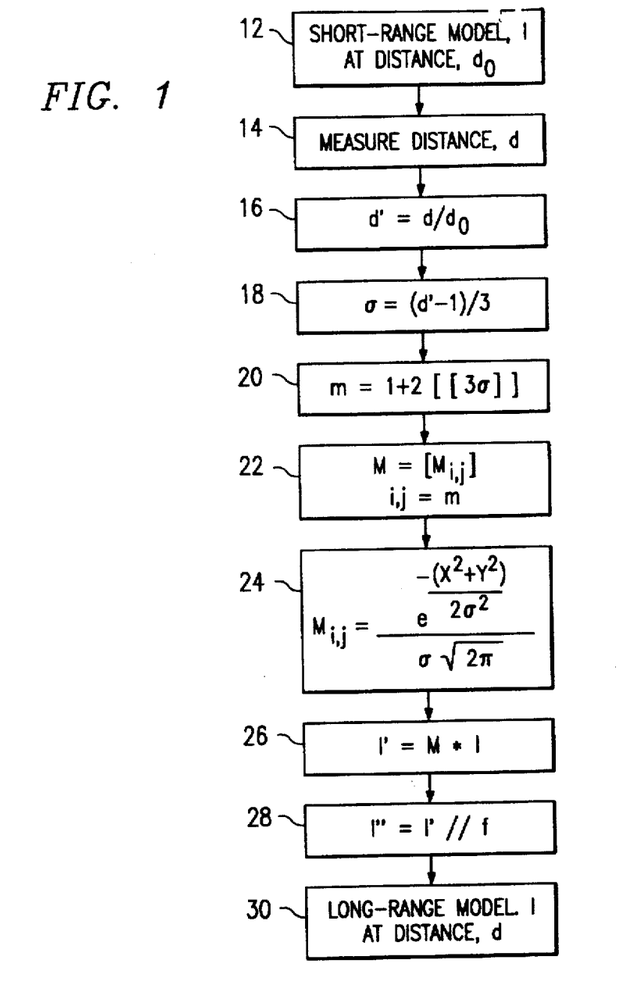
FIG. 1 is a flow diagram of a preferred embodiment of the method of the present invention that demonstrates the generation of a long-range data model from a short-range data model.

FIG. 1 provides a flow diagram of the preferred embodiment of a method 10 for using a short-range data model, I, at a distance, $d_0$, step 12 to generate a long-range model, I", having a sensor-to-object distance, d. The method includes the steps of measuring the long-range sensor-to-object distance, d, step 14 and taking the following ratio:

$$d'=d/d_0,$$

step 16. The value of d' determines the value of standard deviation, σ, step 18. Standard deviation, σ, determines the size, m, of a masking matrix, step 20. Masking matrix, M, comprises elements $[M_{i,j}]$, where $i,j \leq m$, step 22. The elements, $M_{i,j}$, each derive from a Gaussian statistical distribution having standard deviation, σ, step 24. The masking matrix, M, smoothes short-range model, I, to produce the smoothed matrix, I', step 26. The next step 28 of the method entails undersampling the smoothed matrix, I', by undersampling factor, f, to produce the smoothed, undersampled matrix, I". The smoothed, undersampled matrix, I", represents the long-range model at distance, d, step 30.

Figure 2:
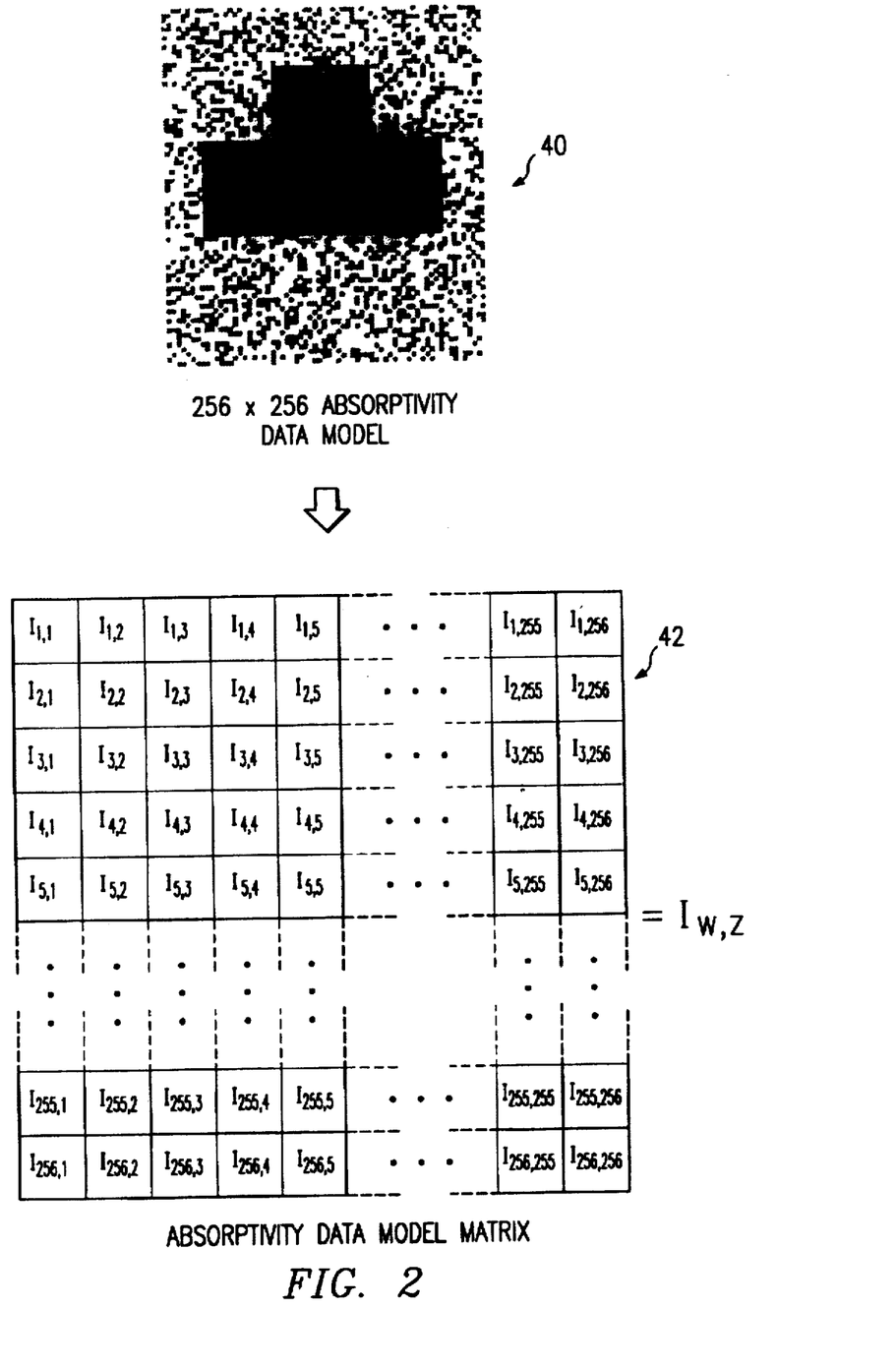
FIG. 2 shows a representation of a 256-by-256 simulated absorptivity data model for use as a short-range data model, according to a preferred embodiment of the present invention.

FIG. 2 shows a short-range absorptivity data model 40. This model can be thought of as a two-dimensional 256-by-256 data matrix, $[I_{w,z}]$, or simply I, denoted at reference number 42, where $1 \leq w, z \leq 256$. A known sensor-to-object distance, $d_0$, corresponds to the short-range model, I.

The method of the present invention obtains long-range data models at distance, d, from a short-range data model at distance, $d_0$. To do this, distance d must first be measured or otherwise known or, at least, guessed at, step 14. The distance is obtainable in a variety of ways. For example, a user could enter the distance or the ballistics of a sensor could be calculated in a well-known manner to provide the distance data. With the high resolution model, I, and the measured distance, d, the smoothing and undersampling steps of the present invention proceed.

In the example of FIG. 2, the smoothing process involves convolving the model matrix, I, by a Gaussian statistical distribution. In the preferred embodiment of the present invention, convolution comprises the step of weighting the data matrix, I, by the Gaussian statistical distribution. The Gaussian statistical distribution values depend on sensor-to-object distance. For the two-dimensional matrix, I, the statistical distribution comprises a two-dimensional Gaussian function with mean (0,0) and standard deviation, σ, given by the following equation:

$$G(x, y) = \frac{e^{-(x^2+y^2)/(2\sigma^2)}}{\sigma\sqrt{2\pi}} \quad (1)$$

As the discussion below explains, this Gaussian statistical distribution depends on the measured distance, d, and the model distance, $d_0$, by way of standard deviation, σ.

It is well known that in each half of a Gaussian distribution, more than 49% of the area of the distribution lies within three standard deviations of the mean. Assuming that σ varies linearly with d, we arrive at the following relationship:

$$3\sigma = (d/d_0) + k_0 \quad (2)$$

where, $d_0$ and $k_0$ are constants. When $d = d_0$, we know that the long-range model is the same as the short-range model. This means that no smoothing of the short-range model is required. Equivalently, this can be regarded as smoothing by a Gaussian with σ=0. Therefore, $k_0 = -1$ and the above equation becomes, $$\sigma = \frac{1}{3}(d'-1) \quad (3)$$

For example, if $d = 3d_0$, then σ=0.667. The method calls for next making this calculation, step 18.

The convolution or smoothing steps of the present invention make use of a masking matrix, M. The masking matrix, M, of the preferred embodiment of the present invention is a square m-by-m matrix. In the preferred embodiment, the masking matrix size, m, is an odd whole number that depends on σ according to the following relationship:

$$m = 1 + 2\lceil\lceil 3\sigma \rceil\rceil, \quad (4)$$

where "⌈[]⌉" is the ceiling operator. The ceiling operator increases numbers containing an integer portion and decimal portion to the next greatest integer. Thus, if σ=0.667, then m=1+2(2)=5. Thus, the next step of the present method is to calculate the value of m, step 20.

Each of the elements of the masking matrix take the values of the Gaussian statistical distribution, G(x,y), where x and y are row and column numbers, respectively, from the origin of the masking matrix. For the example of σ=0.667, at the center of a 5-by-5 masking matrix, i.e., $M_{3,3}$, the distance from the matrix origin is (0,0) and G takes the value G(0,0)=0.5984134. Likewise, at $M_{1,1}$ for a 5-by-5 masking matrix with G=0.667, the element occupying this space is two rows above and two rows to the left of the center element, $M_{3,3}$, so the (x,y) position is (x=2, y=2), and the Gaussian takes the value 7.3850145EE-5. Thus, the next step in the present method is to generate the masking matrix, M, steps 22 and 24.

Figure 3:
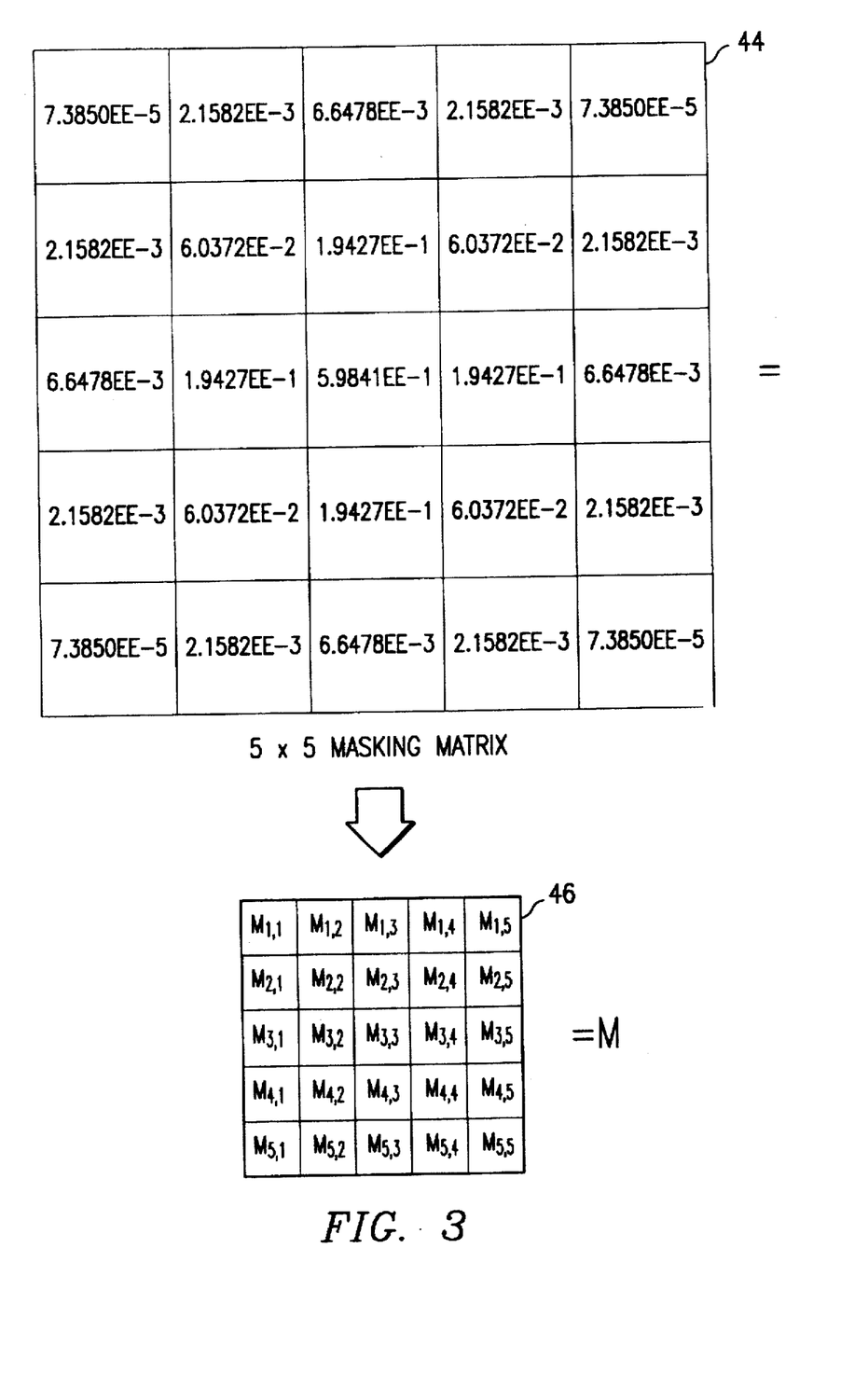
FIG. 3 shows an example of a 5-by-5 masking matrix for smoothing a two-dimensional short-range data model, according to a preferred embodiment of the present invention.

A 5-by-5 masking matrix for a (0,0) mean and σ=0.667 appears at FIG. 3. The numerical values for each element of mask matrix 44 can be thought of as $M_{i,j}$ elements, $1 \leq i, j \leq 5$ in this example 46. Note that the masking matrix components generate a Gaussian distribution symmetrical about the center element of the mask. The numbers can be plotted in a three-dimensional (G(x,y),x,y) space having the (x,y)-plane beneath and G(x,y) axis passing through the matrix center element to generate a two-dimensional normalized bell surface with its maximum value at the masking matrix center element. For example, in the 5-by-5 matrix of FIG. 3, the maximum value of 5.9841EE-1 occurs at the center element $M_{3,3}$. The area under the (G(x,y),x,y) surface equals 1.0.

The function of the masking matrix in the preferred embodiment is to "mask" a portion of the short-range model matrix, I, and thereby smooth it according to the two-dimensional Gaussian distribution, G(x,y). The smoothing step, which the operation M*I denotes, entails multiplying contiguous sections of the data matrix, I, which in the example is a 256-by-256 matrix, by the masking matrix, M, step 26.

Figure 4:
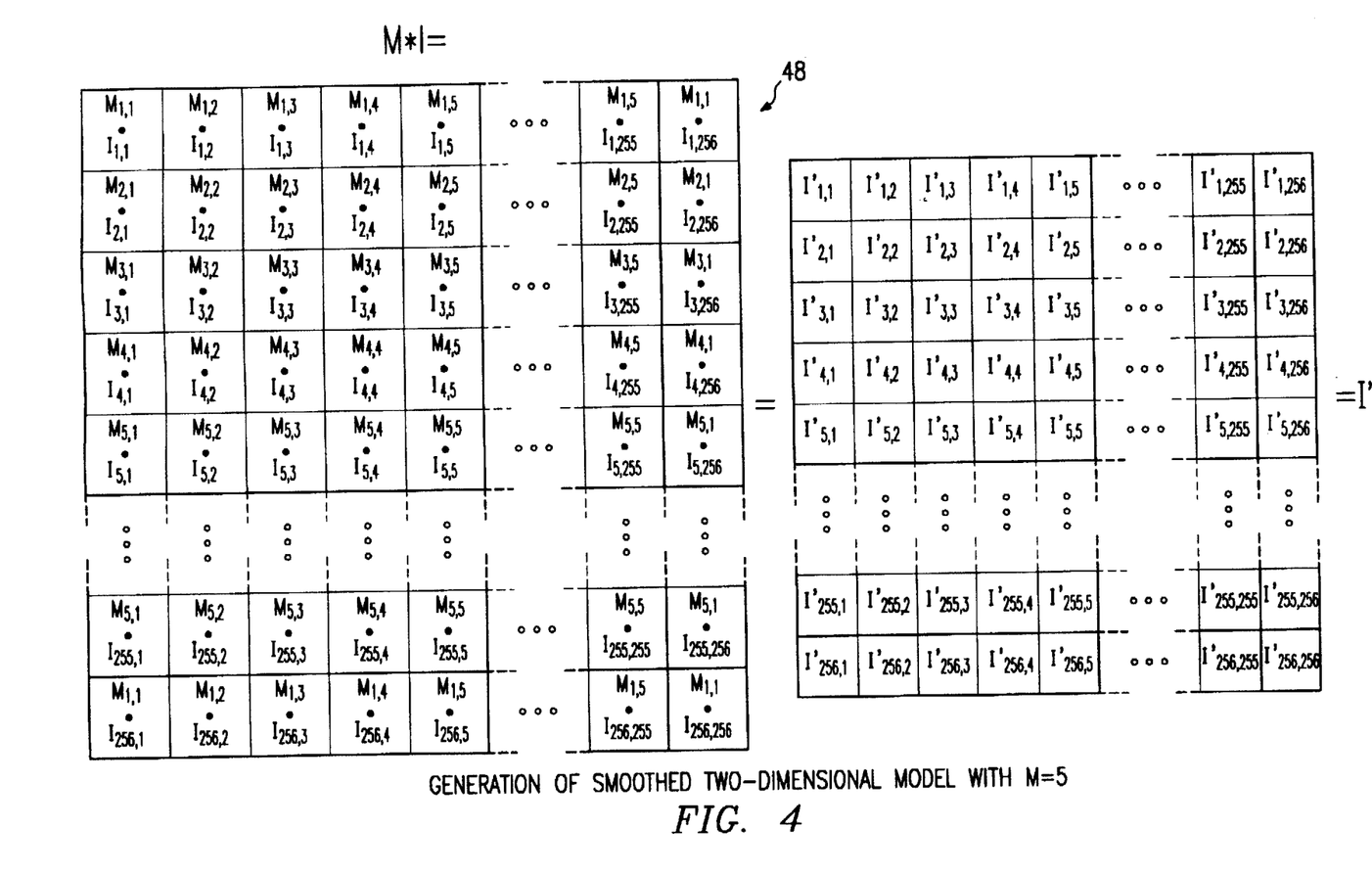
FIG. 4 demonstrates use of a 5-by-5 masking matrix to smooth a 256-by-256 short-range data model, according to a preferred embodiment of the present invention.

FIG. 4 shows an example of the mask multiplication process in which a 5-by-5 masking matrix, M, convolves a 256-by-256 data matrix, I, to produce a smoothed 256-by-256 data matrix, I'. In FIG. 4, masking matrix, M, masks each contiguous 5-by-5 size section of the data matrix, I, by an element-by-element multiplication. The multiplication requires multiplication of each element in the 5-by-5 segment of I to be multiplied by its corresponding element in the masking matrix, M. The result of this masking process is a 256-by-256 data matrix, I', whose elements are masked by the Gaussian distribution, G(x,y).

The next step of the present invention is to undersample the smoothed matrix by a function of the sensor-to-object distance, step 28. The preferred embodiment of the present invention accounts for different sensor-to-object distances by an undersampling factor, f, which equals the ratio of the long-range sensor-to-object distance to the short-range sensor-to-object distance, $d_0$. For example, if $d=3d_0$, then $f = 3d_0/d_0 = 3$.

Figure 5:
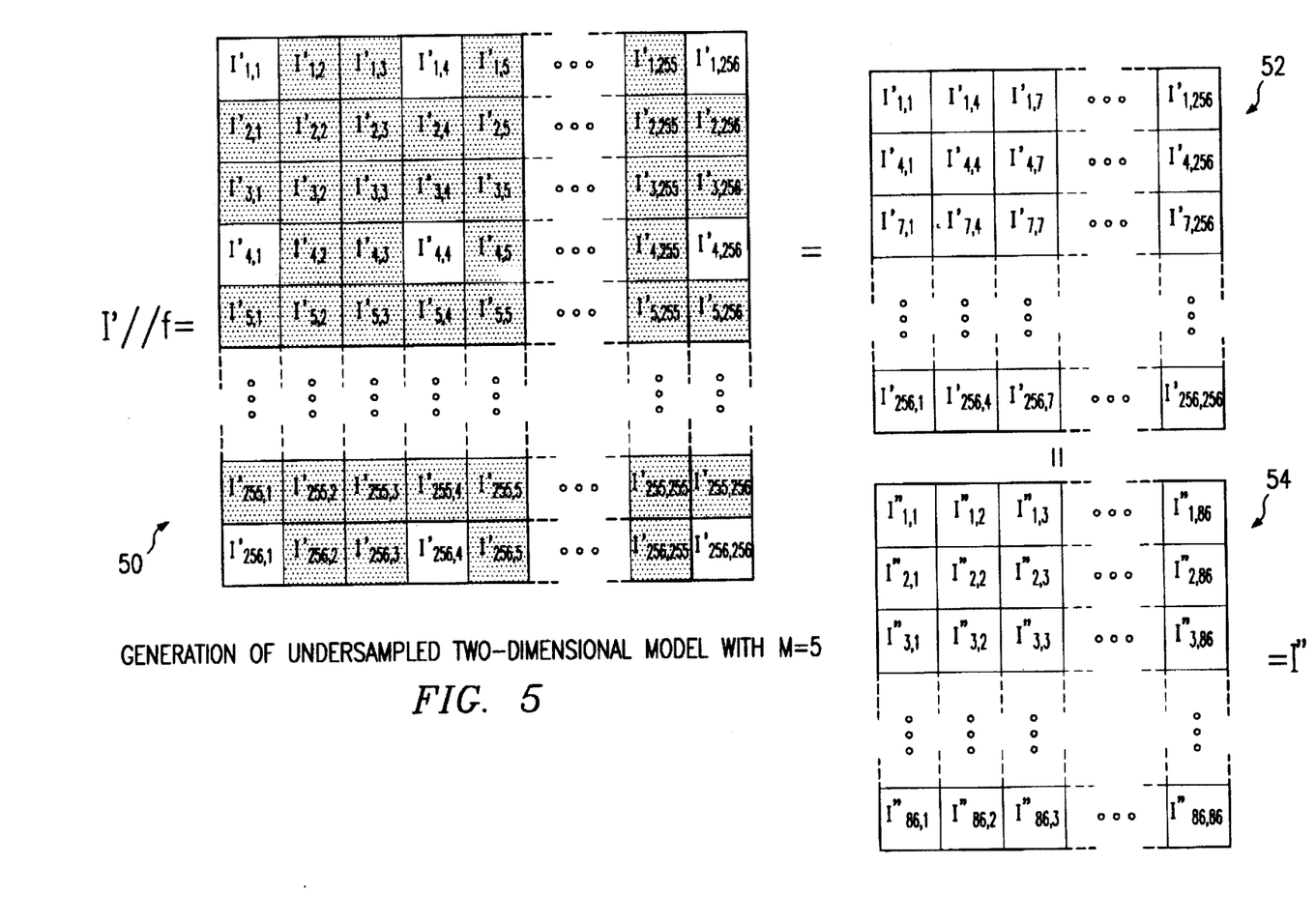
FIG. 5 shows using an undersampling factor to undersample a two-dimensional matrix representing a smoothed short-range model, thereby yielding a long-range model, according to a preferred embodiment of the present invention.

FIG. 5 shows how the undersampled matrix, I", evolves from undersampling the smoothed matrix, I', by the undersampling factor, f. The operation "I"=I'//f" of step 28 denotes this evolution. In the preferred embodiment of the present invention, generation of I" entails extracting from I', those $I'_{i,j}$ that satisfy the following equation:

$$I''_{i,j} = I'_{a,b} \quad (5)$$

where i=1+(a−1)*f, j=1+(b−1)*f, and a and b are positive integers.

Thus, if f=3, $I''_{1,1}=I'_{1,1}$, $I''_{1,2}=I'_{1,4}$; $I''_{2,1}=I'_{4,1}$, etc.

As FIG. 5 shows, I" comprises a submatrix of elements taken from the smoothed matrix, I'. This generates a smaller data matrix, I", that is both smoothed and undersampled from the short-range data matrix, I. Thus, from equation (4), if I' is a 256-by-256 matrix and f=3, then the smoothed undersampled matrix, I", of FIG. 5 is a matrix having a [=((i−1)/f)+1=((256−1)/3)+1 =85+1]=86 rows and, likewise, b=86 columns. The smoothing and scaling steps of the preferred embodiment, therefore, produce a long-range model, I", at a sensor-to-object distance, d, step 30.

Figure 6A:
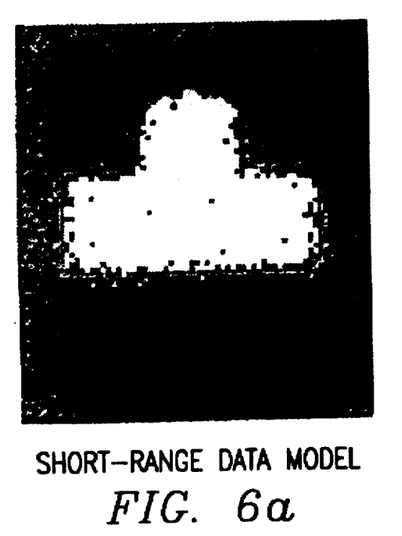
FIGS. 6A and 6B illustrate the results of transforming a short-range absorptivity model to a long-range absorptivity model using a preferred embodiment of the method of the present invention.
Figure 6B:
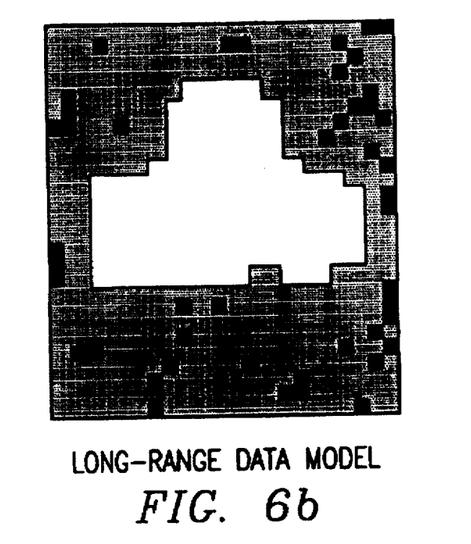
Figure 7A:
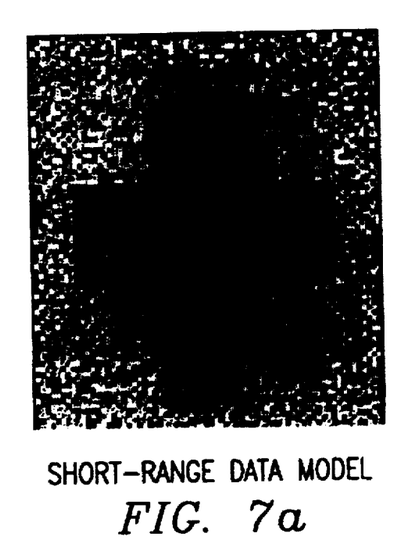
FIGS. 7A and 7B illustrate the results of transforming a short-range conductivity model to a long-range conductivity model using a preferred embodiment of the method of the present invention.
Figure 7B:
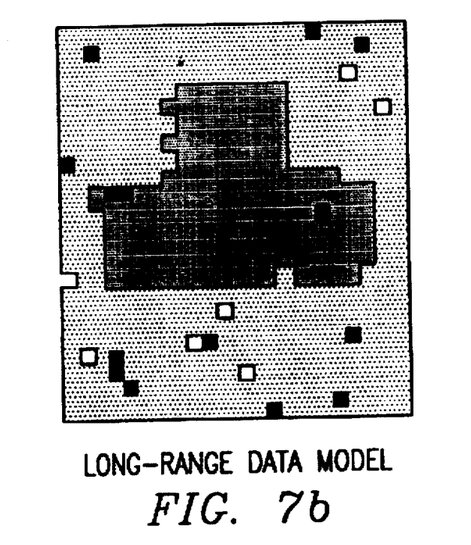

FIG. 6 shows the transformation of a short-range absorptivity data model by the method of the present invention to generate a long-range model having a distance d. FIG. 7 shows the results of transforming a short-range conductivity model at distance $d_0$ to a low resolution conductivity model at a greater distance d. Both the absorptivity and conductivity models of FIGS. 6 and 7 can be represented as 256-by-256 or 512-by-512 pixel digital displays in an x,y-plane. The results of applying the method of the present invention to these short-range data models are lower resolution long-range data models that account for distance differences.

Figure 8:
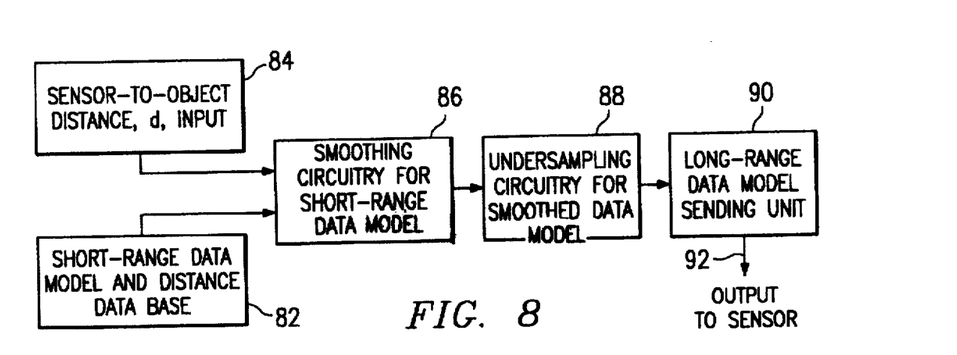
FIG. 8 illustrates a block diagram of the distance relating system for relating short-range models to long-range models according to a preferred embodiment of the present invention.

FIG. 8 shows a distance relating system 80 for generating long-range data models from short-range data models according to the preferred embodiment of the present invention. The system of the present invention comprises a short-range data and distance unit 82 that stores short-range data models and their respective distances in a memory. Sensor-to-object distance input 84 and short-range data model unit 82 provide information inputs to smoothing circuitry 86. Smoothing circuitry 86 receives these inputs and smoothes the high resolution short-range data model as a function of the sensor-to-object distance, d. Undersampling circuitry 88 receives a smoothed short-range data model input from smoothing circuitry 86 and undersamples the smoothed model to produce a smoothed, undersampled long-range model. Long-range model sending unit 90 receives the long-range data model from undersampling circuitry 88 and sends this model to the remainder of the intelligent sensor system 92. The smoothing and undersampling operations of distance relating system 80 are those which FIGS. 1 through 5 and the associated discussions describe. Any combination of electronic circuit components capable of performing those smoothing and undersampling functions on the data matrices can be used for these purposes. Also, the data receiving and transmitting components of distance relating system 80 are well known in the art.

Note that the preferred embodiment of the present invention does not depend on the type of information being smoothed and undersampled. Instead, the only parameter causing the masking matrix and undersampling factor to vary is the change in sensor-to-object distance from the short-range data model to the sensor-to-object distance at long ranges. Thus, the embodiment of the present invention has application across all sorts of sensor data and can be used for any data having a data matrix capable of being smoothed by masking matrix, M.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A computer implemented method for relating disparate data models of a physical object to derive a first-range data model at a first-range distance, d, from a second-range data model at a second-range distance, $d_0$, comprising the steps of:

obtaining said second-range distance from signals transmitted from a sensor corresponding to said physical object;

smoothing the second-range data model by a function of d and $d_0$; and undersampling said smoothed second-range data model to obtain said first-range data model.

2. The computer implemented method of claim 1, wherein said first-range data model comprises a multi-dimensional first-range data model and said second-range data model comprises a multi-dimensional second-range data model.

3. The computer implemented method of claim 1, wherein said smoothing step comprises the step of masking said second-range data model by a masking operator, said masking operator having the same dimension as said second-range data model, said masking operator further having an equal number of odd elements in each dimension, said elements comprising values of a statistical distribution centered about a central coordinate of said masking operator, said number of odd elements being determined by a function of d and $d_0$.

4. The computer implemented method of claim 3, wherein said masking operator comprises a two-dimensional square masking matrix having a first size and said second-range data model comprises a two-dimensional data matrix having a second size.

5. The computer implemented method of claim 4, wherein the first size of said masking matrix corresponds to the ratio of said first-range distance to said second-range distance.

6. The computer implemented method of claim 3, wherein said first size of said masking matrix is obtained from the equation $m = 1 + 2\lceil 3\sigma \rceil$, wherein m is said size, said is a ceiling operator and said $\sigma$ equals a standard deviation of a multi-dimensional Gaussian statistical distribution.

7. The computer implemented method of claim 6, wherein the method further comprises the step of obtaining said $\sigma$ from the equation $\sigma = \frac{1}{3}((d/d_0) - 1)$.

8. The computer implemented method of claim 3, wherein said undersampling step comprises the step of extracting information from said second-range data model to generate said first-range data model having the same dimension as said second-range data model, said first-range date model being smaller in size in each dimension according to the difference in distance between said first-range distance and said second-range distance.

9. The computer implemented method of claim 4, wherein said step of undersampling comprises the step of using an undersampling factor, f, and further comprises the step of extracting from said smoothed second-range data model, having said second size of w-by z, those elements having row, i, and column, j, numbers less than w and z, respectively, and satisfying $i = 1 + (a-1)f$, and $j = 1 + (b-1)f$, where a,b are positive integers, said undersampling factor, f, further corresponding to the ratio of d to $d_0$.

10. The computer implemented method of claim 1, wherein said first-range data model is a long-range data model and wherein said second-range data model is a short-range data model.

11. A method of operating an automatic target recognition system having at least one sensor, and a computer memory, comprising the steps of:

creating a database of second-range data models in said computer memory;

extracting an image of a potential target from said sensors;

determining a distance, $d_0$, between said sensors and said potential target;

smoothing the second-range data model by masking said second-range data model by an m-by-m two-dimensional masking matrix, said masking matrix comprising elements comprising values of a Gaussian statistical distribution having a standard deviation, $\sigma$, and centered about a central coordinate of said two-dimension masking matrix, wherein said masking matrix dimension size, m, derives from the equation $m = 1 + 2\lceil\lceil 3\sigma\rceil\rceil$ and said $\sigma$ equals the standard deviation of said two-dimensional Gaussian statistical distribution, and said $\sigma$ further deriving from the equation $\sigma = \frac{1}{3}((d/d_0) - 1)$;

undersampling said smoothed second-range model to yield a first-range data model by extracting from said two-dimensional second-range data model information to generate said first-range data model having the same dimension as said second-range data model, said undersampling step using an undersampling factor, f, and further comprising the step of extracting from said smoothed two-dimensional second-range data model those elements having row, i, and column, j, numbers less than or equal to the size of the second-range data model matrix that satisfy the equations $i=1+(a-1)f$, and $j=1+(b-1)f$ where a,b are positive integers, said undersampling factor, f, further equaling the ratio value of d to $d_0$; and matching said first-range model against said extracted image to determine whether said potential target matches an object described by said model.

12. The method of claim 11, wherein said two-dimensional second-range data model comprises an absorptivity model.

13. The method of claim 11, wherein said two-dimensional second-range data model comprises a conductivity data model.

14. The method of claim 11, wherein said two-dimensional second-range data model comprises a range image data model.

15. The method of claim 11, wherein said two-dimensional second-range data model further comprises a thermal data model.

16. The method of claim 11, wherein said two-dimensional second-range data model further comprises a photometric data model.

17. A distance relating system in communication with an sensor system for generating first-range data models at a first-range distance from second-range data models at a second-range distance comprising:

a memory for receiving and storing a plurality of said second-range data models;

smoothing circuitry in communication with said memory for smoothing said stored second-range data models according to a function of said first-range distance and said second-range distance;

undersampling circuitry in communication with said smoothing circuitry for undersampling said smoothed second-range data models in relation to said first-range distance to generate said first-range data models; and output circuitry in communication with said undersampling circuitry for outputting said first-range data model to said sensor system.

18. A method of operating an automatic target recognition system having at least one sensor and a computer memory, comprising the steps of:

creating a database with target models at specified distances;

extracting an image from said sensor;

determining a distance, $d_0$, between said target and said sensor;

selecting a second-range model from said database, said second-range model having associated with it a distance d;

using said distance d and $d_0$ to construct a smoothing matrix;

convolving said selected second-range model with said smoothing matrix thereby constructing a smoothed model;

undersampling said smoothed model, thereby constructing a first-range model corresponding to distance $d_0$; and comparing said first-range model and said image to determine if there is a match between said model and said image.

19. A computer implemented method for relating disparate data models of physical object to derive a first-range data model at a first-range distance from a second-range data model at a second-range distance comprising the steps of:

obtaining said second-range distance from signals transmitted from a sensor corresponding to the physical object;

smoothing the second-range data model by a function of d and $d_0$; undersampling said smoothed second-range data model to obtain said first-range data model by function of d and $d_0$; and transmitting said first-range data model as additional signals to said sensor and modifying said sensor in accordance with said first-range data model.

20. A computer implemented method for relating disparate data models of a physical object to derive a first-range data model at a first-range distance, d, from a second-range data model at a second-range distance, $d_0$, comprising the steps of:

converting physical characteristics of said physical object to signals by a sensor;

obtaining said second-range distance from said signals transmitted from said sensor corresponding to said physical object;

smoothing the second-range data model by a function of d and $d_0$; and undersampling said smoothed second-range data model to obtain said first-range data model.

21. A method for relating disparate data models of a physical object to derive a first-range data model at a first-range distance, d, from a second-range data model at a second-range distance, $d_0$, comprising the steps of:

detecting physical characteristics of said physical object;

converting said physical characteristic to signals by a sensor;

obtaining said second-range distance from said signals transmitted from said sensor corresponding to said physical object;

smoothing the second-range data model by a function of d and $d_0$; and undersampling said smoothed second-range data model to obtain said first-range data model.

* * * * *